(12) United States Patent
Maitra et al.

(10) Patent No.: US 10,607,232 B2
(45) Date of Patent: Mar. 31, 2020

(54) AUTOMATIC ASSISTANCE FOR RESOURCE REUSE BASED ON CONTEXT EXTRACTED FROM A USER WORKSPACE

(71) Applicant: Accenture Global Services Limited, Dublin (IE)

(72) Inventors: Anutosh Maitra, Bangalore (IN); Tom Geo Jain, Bangalore (IN); Shubhashis Sengupta, Bangalore (IN); Vikrant S. Kaulgud, Pune (IN)

(73) Assignee: Accenture Global Services Limited, Dublin (IE)

( * ) Notice: Subject to any disclaimer, the term of this patent is extended or adjusted under 35 U.S.C. 154(b) by 801 days.

(21) Appl. No.: 14/833,603

(22) Filed: Aug. 24, 2015

(65) Prior Publication Data
US 2016/0063067 A1 Mar. 3, 2016

(30) Foreign Application Priority Data
Aug. 26, 2014 (IN) .......................... 4161/CHE/2014

(51) Int. Cl.
*G06F 16/93* (2019.01)
*G06F 16/435* (2019.01)
(Continued)

(52) U.S. Cl.
CPC ......... *G06Q 30/016* (2013.01); *G06F 16/435* (2019.01); *G06F 16/93* (2019.01); *G06Q 10/103* (2013.01)

(58) Field of Classification Search
None
See application file for complete search history.

(56) References Cited

U.S. PATENT DOCUMENTS

| 6,928,425 B2 * | 8/2005 | Grefenstette | ..... G06F 17/30011 707/754 |
| 2003/0225587 A1 * | 12/2003 | Mueller | ................ G06Q 10/10 705/301 |

(Continued)

FOREIGN PATENT DOCUMENTS

CA          2789899 A1     9/2011

OTHER PUBLICATIONS

Salton, "Automatic Text Processing—The Transformation, Analysis, and Retrieval of Information by Computer", 1989, 530 pages. (Book).

(Continued)

*Primary Examiner* — James Trujillo
*Assistant Examiner* — Cheryl M Shechtman
(74) *Attorney, Agent, or Firm* — Harrity & Harrity, LLP

(57) ABSTRACT

A device may receive, from a user device, an implicit search request identifying a resource accessed by a user of the user device. Based on properties defined in a user role and a rule identified in context configuration information, the device may determine an intent associated with the user and a context associated with the intent and the resource accessed by the user. The device may send, based on query options identified in search configuration information, a search query identifying search criteria associated with the context, and may receive a search response identifying available resources that satisfy the search criteria. The device may determine a probability, for each of the available resources, that the available resource matches the context, identify a portion of the search response based on the probabilities, and send the portion to the user device.

20 Claims, 12 Drawing Sheets

(51) Int. Cl.
*G06Q 10/10* (2012.01)
*G06Q 30/00* (2012.01)

(56) References Cited

U.S. PATENT DOCUMENTS

| | | | |
|---|---|---|---|
| 2009/0083220 A1* | 3/2009 | Petri | G06F 17/30011 |
| 2013/0166528 A1 | 6/2013 | Morris | |
| 2014/0214871 A1* | 7/2014 | Adams | G06F 16/24575 |
| | | | 707/758 |
| 2015/0012532 A1* | 1/2015 | Heymans | G06F 17/30011 |
| | | | 707/736 |

OTHER PUBLICATIONS

Cybulski, "Reuse of Early Life-Cycle Artefacts: Reusing Requirements with a Word Processor?",1997, 8 pages.

Parsons et al., "Cognitive Heuristics in Software Engineering: Applying and Extending Anchoring and Adjustment to Artifact Reuse", IEEE Transactions on Software Engineering, vol. 30, No. 12, Dec. 2004, 873-888.

Salami et al., "UML Artifacts Reuse: State of the Art", The International Journal of Soft Computing and Software Engineering [JSCSE], vol. 3, No. 3, Special Issue: The Proceeding of International Conference on Soft Computing and Software Engineering 2013 [SCSE'13]. Mar. 1-2, 2013, 8 pages.

Birk et al., "A Knowledge Management Lifecycle for Experience Packages on Software Engineering Technologies", IESE-Report No. 007.99/E, Version 1.0, Feb. 1999, 37 pages.

Jha et al., "Identifying Issues and Concerns in Software Reuse in Software Product Lines", 2009, 11 pages.

Chaudron, "1 Software Reuse and Component Based Software Engineering", Feb. 9, 2007, 22 pages.

Cruz et al., "Modeling Context in Software Reuse", 2007, 14 pages.

* cited by examiner

AUTOMATIC ASSISTANCE FOR RESOURCE REUSE BASED ON CONTEXT EXTRACTED FROM A USER WORKSPACE

RELATED APPLICATION

This application claims priority to Indian Patent Application No. 4161/CHE/2014, filed Aug. 26, 2014 the disclosure of which is incorporated by reference herein in its entirety.

BACKGROUND

A user of a user device often uses the user device to perform a task, such as solving a problem or generating a work product. The user device may have access to resources containing information relevant to completing the task, such as an existing solution or work product associated with the task or a similar task.

SUMMARY

According to some possible implementations, a device may include one or more processors to receive, from a user device, an implicit search request including user workspace information associated with a user workspace. The one or more processors may determine a context, including a user intent, based on the user workspace information and send a search query based on the context. The one or more processors may further receive a search response identifying search results based on the search query, and provide, to the user device, some or all of the search results identified in the search response.

According to some possible implementations, a method may include receiving, by a device and from a user device, workspace information identifying a role associated with a user and including a resource associated with a user workspace and determining, by the device, a context associated with the role and the resource. The method may further include identifying, by the device, a search device associated with the context based on search configuration information which identifies the search device and includes query options associated with the search device and sending, by the device and to the search device, a search query based on the context and the query options included in the search configuration information. The method may further include receiving, by the device and from the search device, a search response identifying search results based on the search query and sending, by the device and to the user device, some or all of the search results identified in the search response.

According to some possible implementations, a method may include receiving, by a device and from a user device, an implicit search request identifying a resource accessed by a user of the user device; identifying, by the device, a user role, associated with the user, from a list of user roles contained in role configuration information; identifying, by the device, properties, associated with the user role, from the role configuration information; determining, by the device, an intent associated with the user based on the properties associated with the user role; and determining, by the device, a context associated with both the resource accessed by the user and an intent associated with the user based on the properties associated with the user role, and based on a rule identified in context configuration information. The method may further include sending, by the device, a search query, based on search query options identified in search configuration information, identifying search criteria associated with the context; receiving, by the device, a search response identifying available resources that satisfy the search criteria; determining, by the device, a probability, for each of the available resources, that the available resource matches the context; identifying a portion of the search response based on the probabilities of the available resources, identified by the search response, to the context; and sending, by the device and to the user device, the identified portion of the search response.

DETAILED DESCRIPTION

The following detailed description of example implementations refers to the accompanying drawings. The same reference numbers in different drawings may identify the same or similar elements.

A user of a user device often uses the user device to perform a task, such as solving a problem and/or generating a work product. The user device may have access to information relevant to the user's accomplishment of the task, such as resources that identify existing solutions and/or work products associated with the task and/or a similar task. Despite having access to these existing resources, the user may not use the relevant information to complete the task for a number of reasons. Difficulty determining what information is required for the task, where the existing resources containing that information are stored, how to form an optimal search query to locate those existing resources, and/or how to identify relevant information from the search results may prevent the user from successfully attempting or completing a search. Implementations described herein may alleviate these difficulties by automatically searching for and sorting relevant resources for the user based on determining a context, including an intent, associated with information extracted from the user device. Implementations described herein may, for example, find particular applicability in the field of software development, where automatically pushing reusable elements to a developer's workspace may rapidly accelerate development by preventing the developer from re-inventing those elements.

Figure 1:
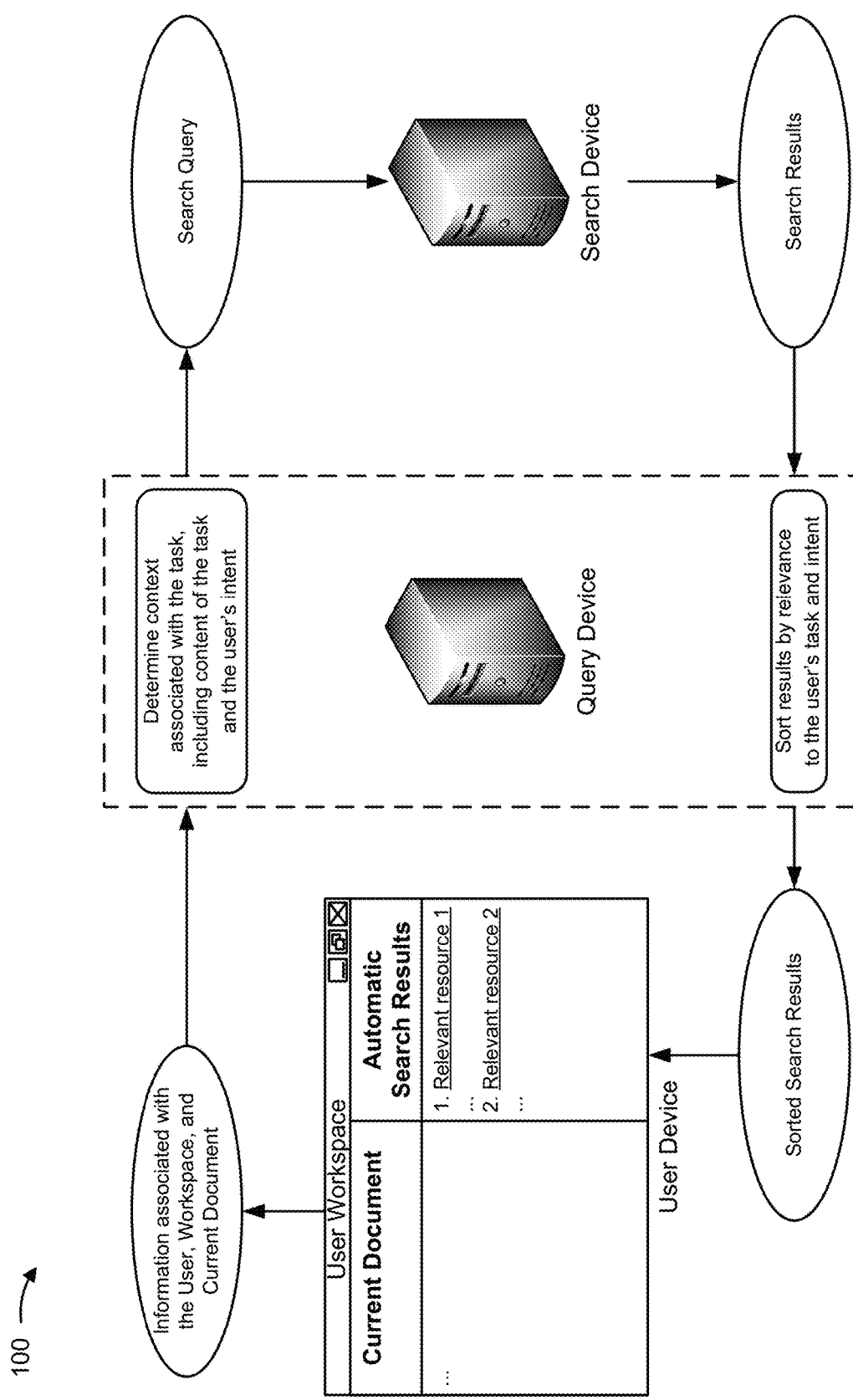
FIG. 1 is a diagram of an overview of an example implementation described herein.

FIG. 1 is a diagram of an overview of an example implementation 100 described herein. As shown in FIG. 1, example implementation 100 may include a user device, a query device, and one or more search devices.

A user may access and/or create a document (shown as "Current Document") within a user workspace displayed on the user device. For example, the current document may represent the user's in-progress work product, a reference document, a message, or the like. As the user views and/or modifies the current document, the user workspace may automatically (e.g., without requiring an explicit request or input from the user) send an implicit search request, to the query device, including information associated with the current document, the user workspace, and/or the user. The query device may determine a context associated with the implicit search request, including content of the current document and an intent associated with the content (e.g., what the user intends to do with the current document and/or search results associated with the current document). The query device may generate and send, to a search device, a search query based on determining the context. The search device may perform a search based on the search query, and return, to the query device, search results identifying resources matching the search query. For each of the identified resources, the query device may determine a likelihood that the resource is associated with the context and provide, to the user, search results sorted by likelihood of association to the context/intent. In this way, the query device may provide the user with relevant information for performing the task based on the context of the current document/workspace and the user's intent.

Figure 2:
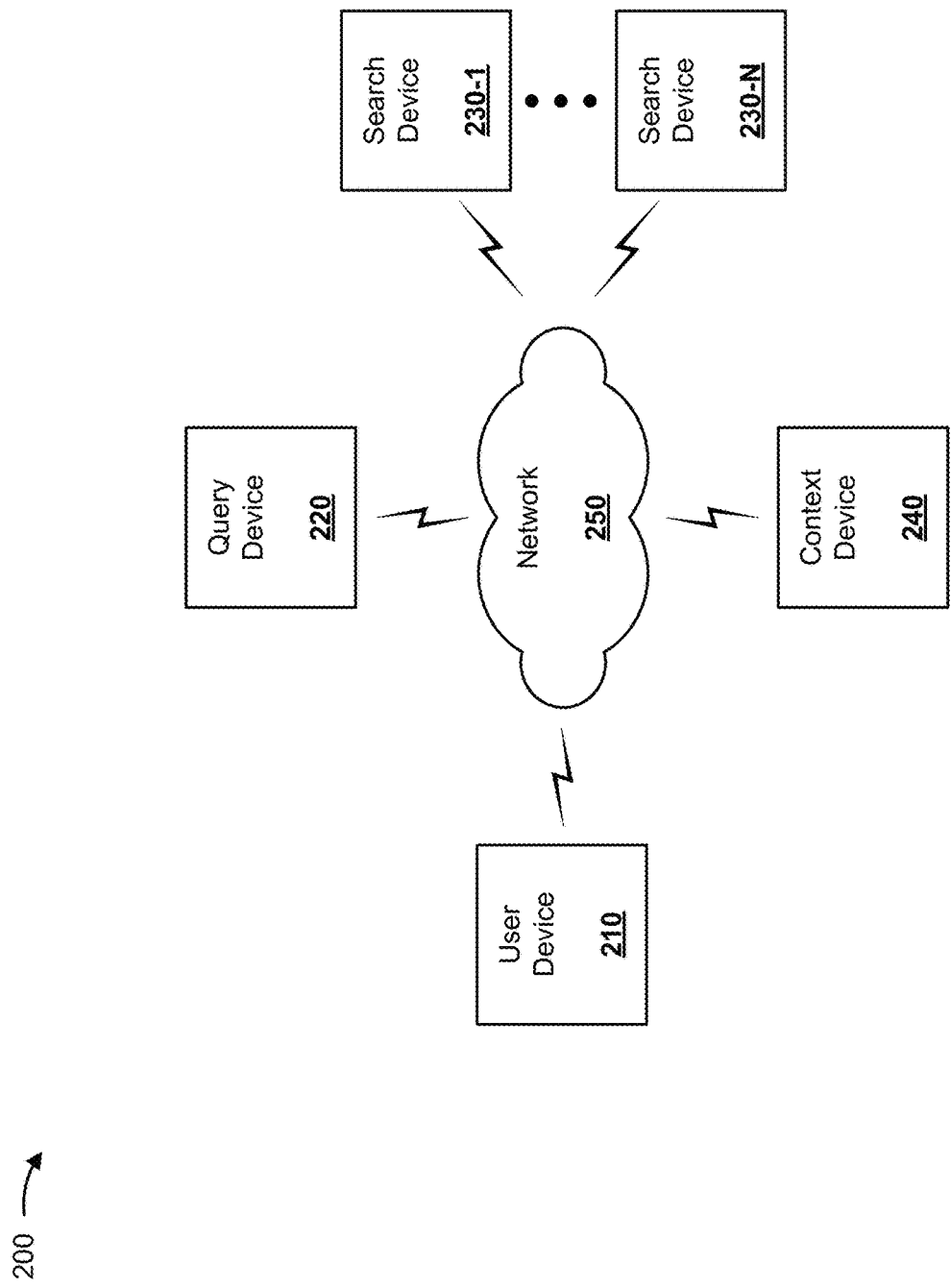
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210; a query device 220; a group of search devices 230-1, . . . , 230-N (hereinafter referred to collectively as "search devices 230" and individually as "search device 230"); a context device 240; and a network 250. Devices of environment 200 may interconnect via wired connections, wireless connections, or a combination of wired and wireless connections.

User device 210 may include a device capable of receiving, generating, storing, processing, and/or providing information related to a user task. For example, user device 210 may include a communications and/or computing device, such as a mobile phone (e.g., a smart phone, a radiotelephone, etc.), a laptop computer, a tablet computer, a handheld computer, a desktop computer, a gaming device, or a similar device. In some implementations, user device 210 may receive information from and/or transmit information to another device in environment 200. For example, user device 210 may send and/or receive information associated with an implicit search request to query device 220 and/or search device 230.

Query device 220 may include one or more devices capable of storing, processing, and/or routing information, such as a server device or a collection of server devices. In some implementations, query device 220 may include a communication interface that allows query device 220 to receive information from and/or transmit information to other devices in environment 200. For example, query device 220 may send and/or receive information, associated with servicing an implicit search request, to/from user device 210, search device 230, and/or context device 240.

Search device 230 may include one or more devices capable of storing, processing, and/or routing information, such as a server device or a collection of server devices. In some implementations, search device 230 may include a communication interface that allows search device 230 to receive information from and/or transmit information to other devices in environment 200. For example, search device 230 may send and/or receive information, associated with a search request, to/from user device 210 and/or query device 220.

Context device 240 may include one or more devices capable of storing, processing, and/or routing information, such as a server device or a collection of server devices. In some implementations, context device 240 may include a communication interface that allows context device 240 to receive information from and/or transmit information to other devices in environment 200. For example, context device 240 may send and/or receive information, associated with a role configuration request, to/from query device 220.

Network 250 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
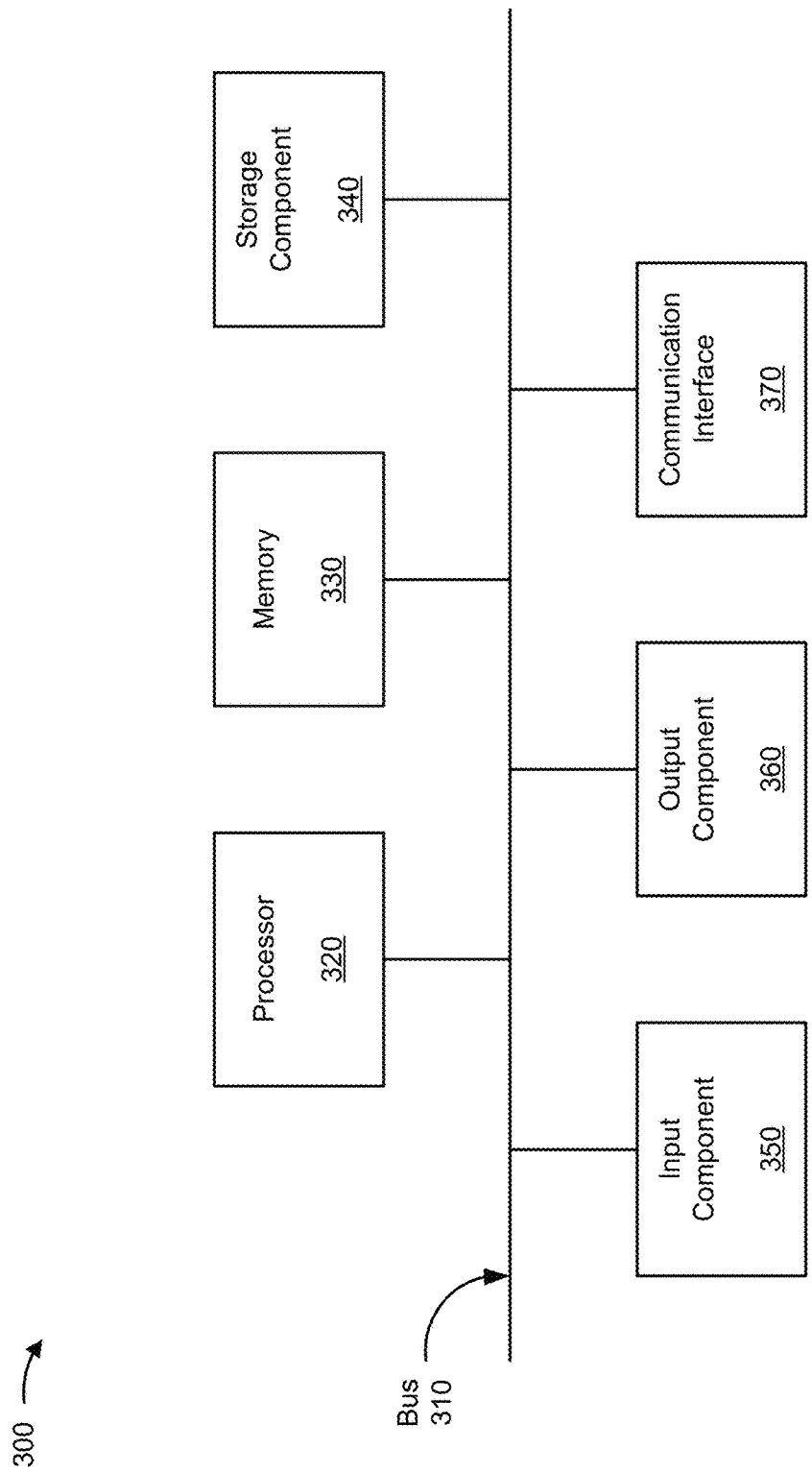
FIG. 3 is a diagram of example components of one or more devices of FIG. 2.

FIG. 3 is a diagram of example components of a device 300. Device 300 may correspond to user device 210, query device 220, search device 230, and/or context device 240. In some implementations, user device 210, query device 220, search device 230, and/or context device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
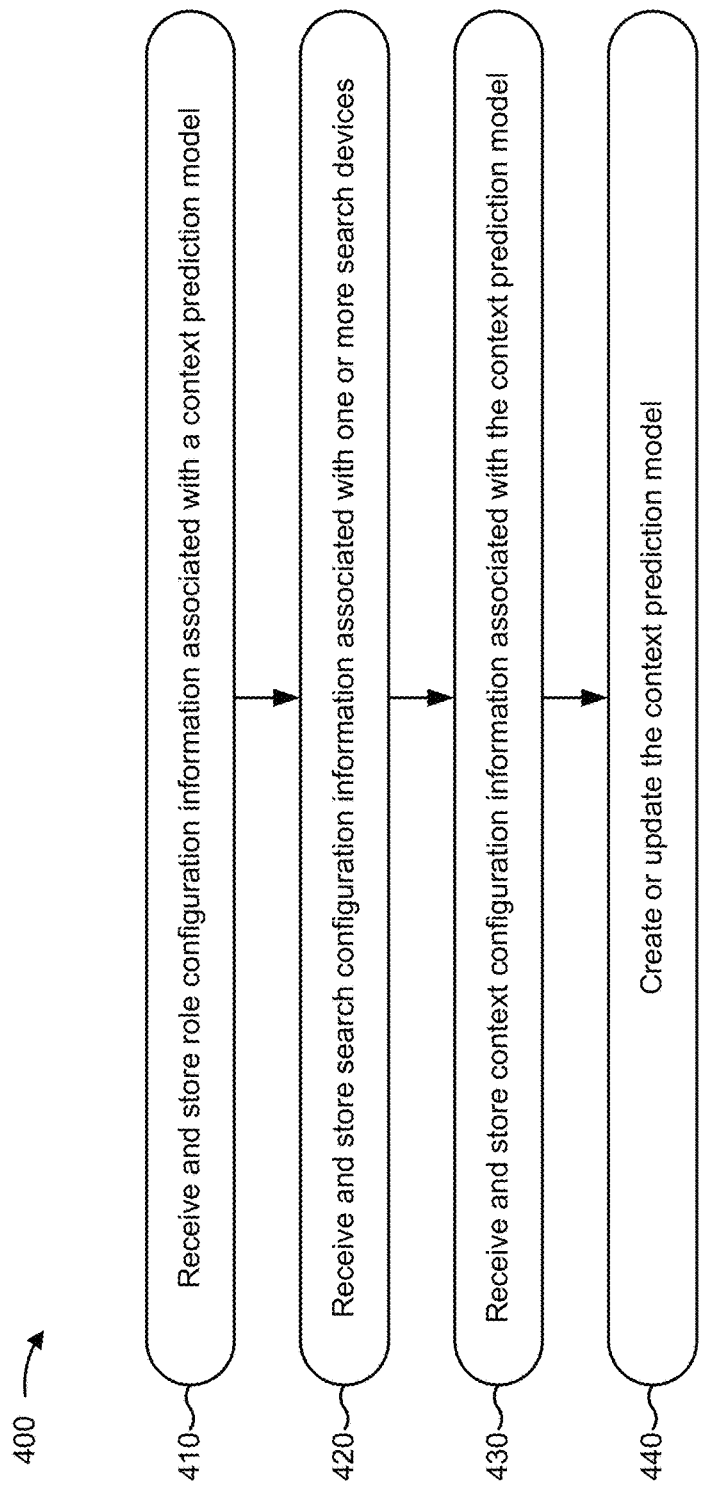
FIG. 4 is a flow chart of an example process for setting up an implicit search service.

FIG. 4 is a flow chart of an example process 400 for setting up an implicit search service. In some implementations, one or more process blocks of FIG. 4 may be performed by query device 220. In some implementations, one or more process blocks of FIG. 4 may be performed by another device or a group of devices separate from or including query device 220, such as user device 210, search device 230, and/or context device 240.

As shown in FIG. 4, process 400 may include receiving and storing role configuration information associated with a context prediction model (block 410). For example, query device 220 may request and receive role configuration information from context device 240. The role configuration information may include a list of roles associated with authors of resources and/or users of user device 210. For example, the role configuration information may list job titles associated with a company, positions held by members of a team, or the like. The role configuration information may further identify a purpose, objective, responsibility, environment, domain, context prediction methodology, or the like, associated with a role, project, phase, user, author, or the like. For example, in a software development application, the role configuration information may include a job description associated with a job title, a list of responsibilities associated with a position, a project description including a software/hardware platform, objectives associated with one or more phases (e.g., analyze, design, build, test, deploy), client needs, a business domain (e.g., an implementation of a business model in a programming language), or the like. Additionally, or alternatively, the role configuration information may identify search repositories which a user may access and/or which may be of interest to the user, based on the user's role. Query device 220 may provide the role configuration information as input to the context prediction model to determine an intent associated with a user's role. Alternatively, or additionally, query device 220 may determine the context prediction model based on the role configuration information.

As further shown in FIG. 4, process 400 may include receiving and storing search configuration information associated with one or more search devices (block 420). For example, query device 220 may receive search configuration information, such as identification information associated with one or more search devices 230 and/or search repositories (e.g., a uniform resource identifier/location (URI/URL), host/domain identifier, resource identifier, etc.). Based on the identification information, query device 220 may determine where to send a search query (e.g., to which search device 230) and/or which search repositories are available to search. Additionally, or alternatively, search configuration information may include permission information associated with search device 230 and/or associated with a search repository. Based on the permission information, query device 230 may determine a subset of search repositories and/or search devices 230 from which a user of a user device may obtain search results. Additionally, or alternatively, the configuration information may include search query options (e.g., Boolean logic, URI/URL format, permitted operators, non-permitted operators, etc.) associated with search devices 230 and/or search repositories identified in the identification information. The search query options may be different for difference search devices 230. Based on the search query options, query device 220 may determine how to form a search query to be sent to search device 230. In this way, query device 230 may use the search configuration information to determine where and how to search for resources relevant to a user's task.

As further shown in FIG. 4, process 400 may include receiving and storing context configuration information associated with the context prediction model (block 430). For example, the context configuration information may include context metadata (e.g., a schema and/or data dictionary) associated with resources contained within one or more search repositories. The context metadata may include, e.g., an ontology which formally represents information contained within the resources as a hierarchy of concepts within a domain, using a shared vocabulary to denote the types, properties, and/or interrelationships of those concepts. Alternatively, or additionally, the context metadata may include a term glossary which indexes words, phrases, and/or relationships associated with the resources in the context of one or more domains associated with the resources. Additionally, or alternatively, the context metadata may include a process profile index identifying capabilities associated with the resources.

Query device 220 may continually, periodically, and/or systematically access (e.g., crawl) search device 230 to receive information included in and/or associated with the resources. This received information may include the context metadata. Alternatively, or additionally, query device 220 may use the received information to generate and/or modify the context configuration information (using, e.g., natural language processing techniques).

As further shown in FIG. 4, process 400 may include creating or updating the context prediction model (block 440). For example, query device 220 may create or modify the context prediction model based on the received context configuration information. The context prediction model may include a set of rules by which query device 220 may standardize and/or identify the context of information associated with a resource and/or a user workspace. By standardizing information associated with resources and/or workspaces, query device 220 may compare different information for equivalence or sort the information. Query device 220 may apply rules associated with the context prediction model, such as one or more ambiguity and/or testability rules, to identify and/or resolve ambiguities in the context metadata (e.g., when an interrelation of concepts is not clearly identified and/or when a term has an uncertain meaning or context). Query device 220 may provide the context prediction model with user workspace information as input to determine a context associated with a user's role/task so that query device 220 may generate a search query based on the context. Query device 220 may further provide search results, retrieved using the query, as input to the context prediction model to determine a likelihood that each result is associated with the context.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to the example process 400 shown in FIG. 4. FIGS. 5A-5D show an example of setting up an implicit search service.

Figure 5A:
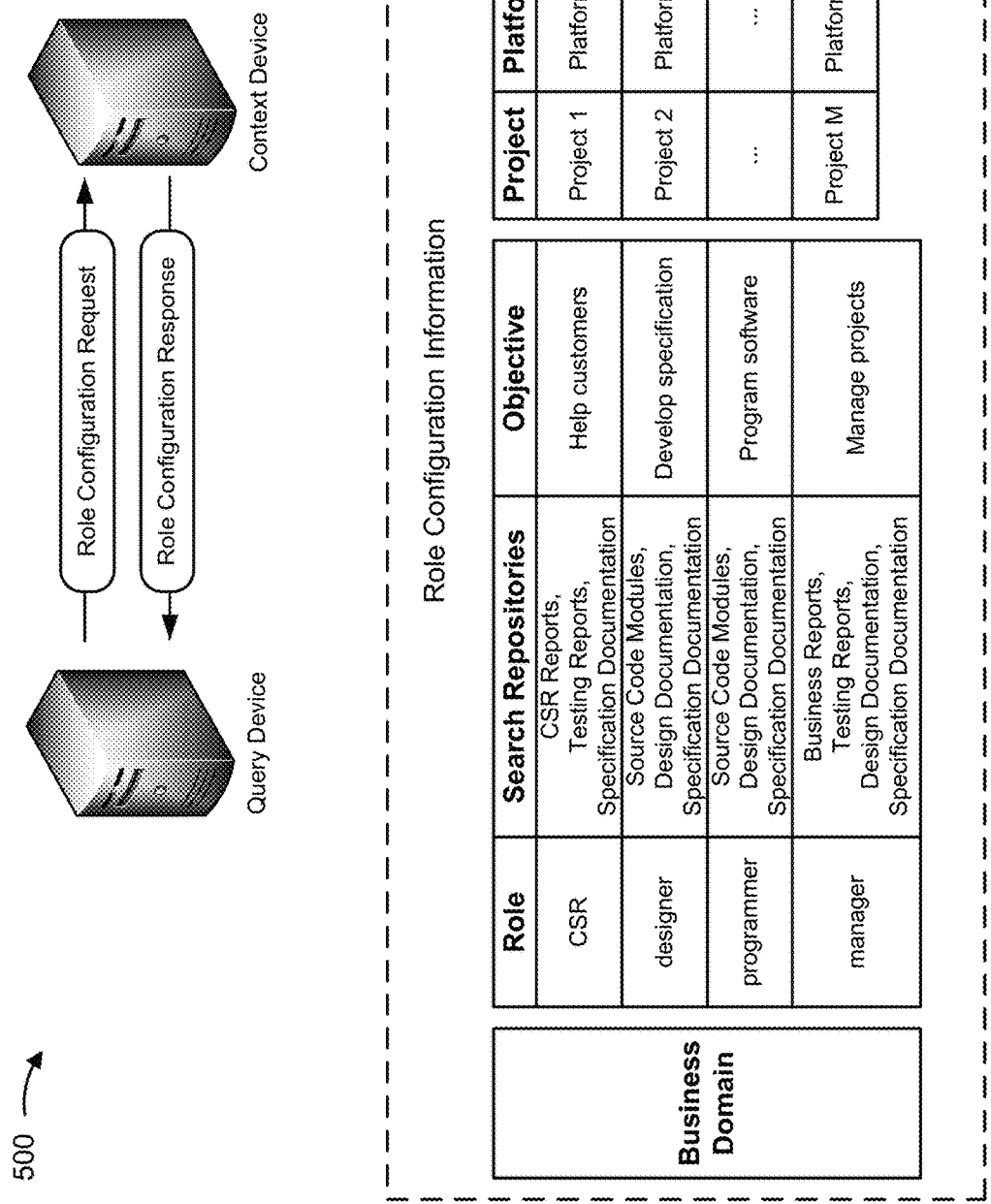
FIGS. 5A-5D are diagrams of an example implementation relating to the example process shown in FIG. 4.

As shown in FIG. 5A, assume, for example implementation 500, that query device 220 sends a role configuration request to context device 240 and likewise receives, from context device 240, a role configuration response containing role configuration information. Assume that the role configuration information includes a business domain and a list of roles associated with the business domain: customer service representative (CSR), designer, programmer, and manager. Assume that the role configuration information further identifies search repositories relevant to the identified roles: CSR Reports, Testing Reports, and Specification Documentation for a CSR; Source Code Modules, Design Documentation, and Specification Documentation for a designer or programmer; and Business Reports, Testing Reports, Design Documentation, and Specification Documentation for a manager. Assume further that the role configuration information includes a list of projects (Projects 1-M) and identifies, for each project, a platform (Platforms 1-N) and analyze, design, build, and deploy phase objectives. Query device 220 stores the role configuration information in memory accessible to query device 220.

Figure 5B:
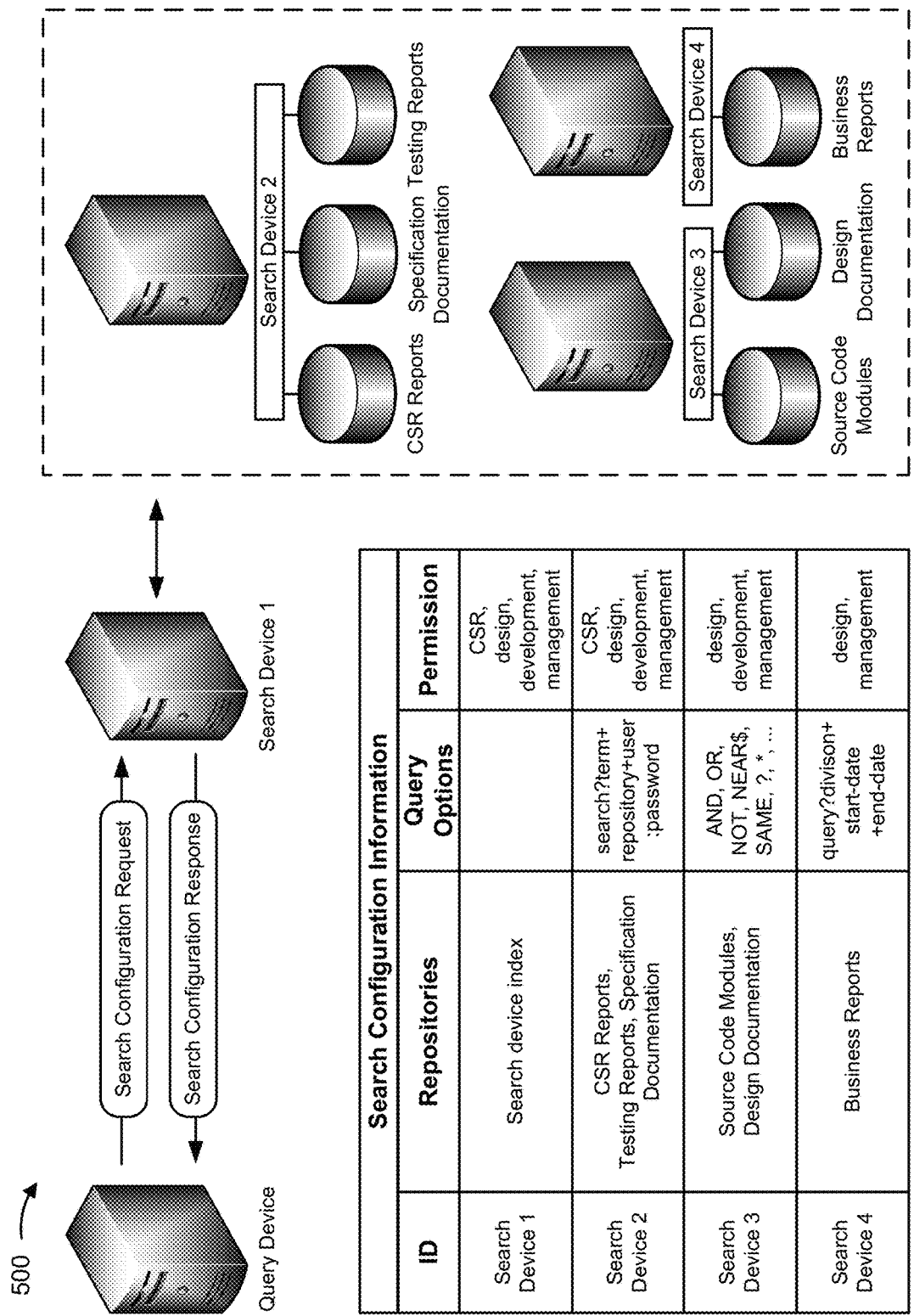

As shown in FIG. 5B, assume, for example implementation 500, that query device 220 sends a configuration request to a first search device 230 and receives, from the first search device 230, a search configuration response including search configuration information. Assume further that the search configuration information includes identification information associated with the first search device 230 as well as identification information associated with second, third, and fourth search devices 230. In some implementations, query device 220 may send a similar configuration request to each of the other identified search devices 230 and likewise may receive, from each search device 230, a search configuration response, including additional search configuration information. Assume that the search configuration information, received from the search devices 230, identifies search repositories associated with each search device 230, including: a search device index associated with the first search device 230; CSR Reports, Specification Documentation, and Testing Reports associated with the second search device 230; Source Code Modules and Design Documentation associated with the third search device 230; and Business Reports associated with the fourth search device 230. Assume that the search configuration information further includes search query options associated with each search device and its search repositories (e.g., "search?term+repository+user:password" for the second search device 230; "AND, OR, NOT, NEAR$, SAME, ?, *," etc. for the third search device 230; and "query?divison+start-date+end-date" for the fourth search device 230. Query device 220 may store the search configuration information in memory accessible to query device 220. In this way, query device 220 may determine what resources/repositories are available, where to find the available resources, and how to form a search query to retrieve the available resources.

Figure 5C:
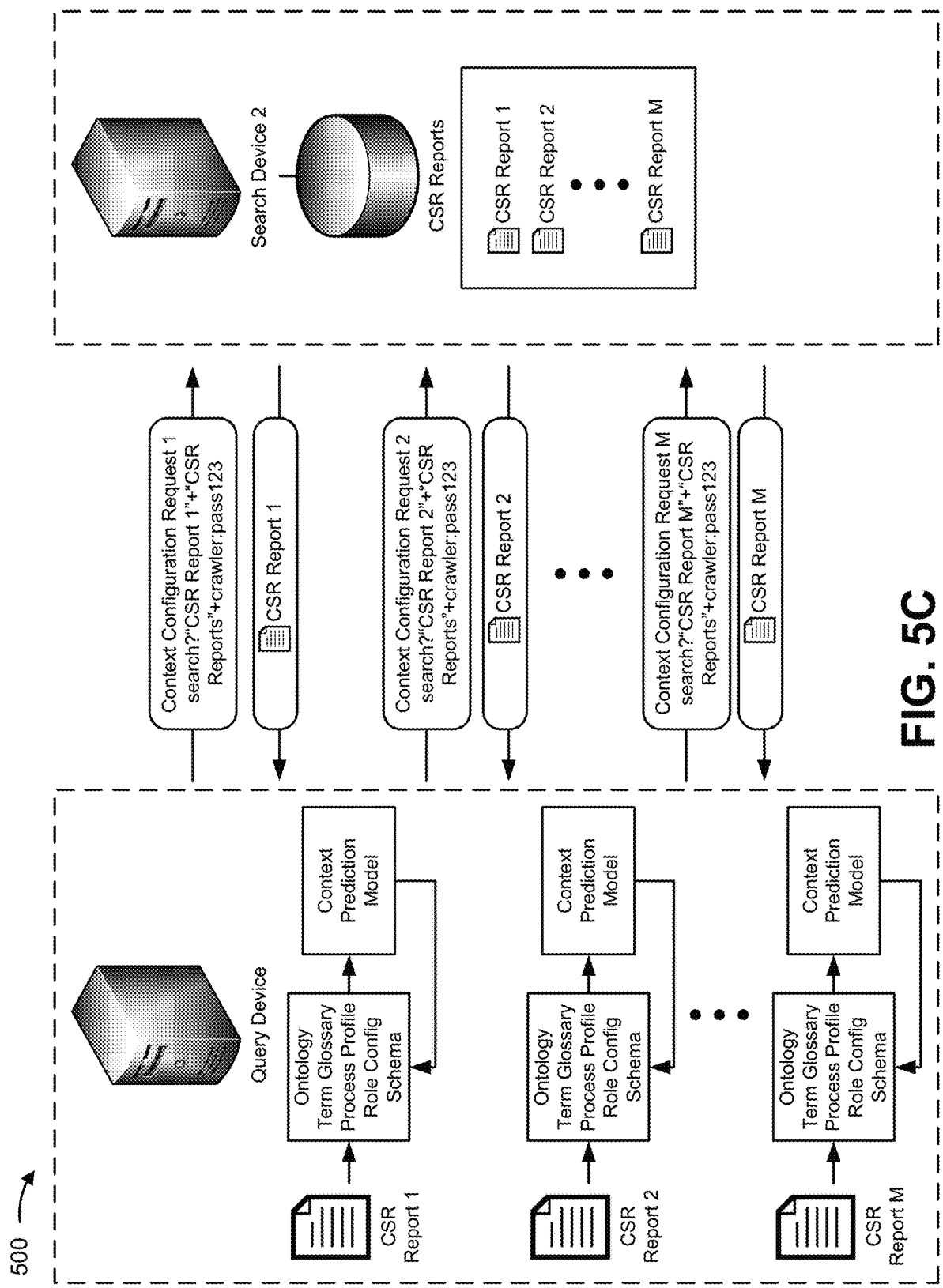

As shown in FIG. 5C, assume, for example implementation 500, that query device 220 receives context configuration information by crawling the CSR Reports search repository associated with the second search device 230. Assume further that query device 220 sends, to the second search device 230, a first context configuration request identifying a first CSR Report resource, the CSR Reports search repository, and a username/password. Second search device 230 sends, to query device 220, the first CSR Report based on the first request. Query device 220 updates a context prediction model based on the first CSR Report and context configuration information, including an ontology, term glossary, process profile, role configuration information, and schema. Query device 220 updates the context configuration information based on the first CSR Report and/or based on the updated context prediction model. Query device 220 likewise sends additional context configuration requests to the second search device 230, receives additional resources associated with the additional context configuration requests, and/or updates the context prediction model and context configuration information until query device 220 has processed all the available resources of the CSR Reports search repository. Query device 220 may likewise crawl additional search repositories associated with the second search device 230 and/or additional search devices 230 to further update the context prediction model and/or the context configuration information.

Figure 5D:
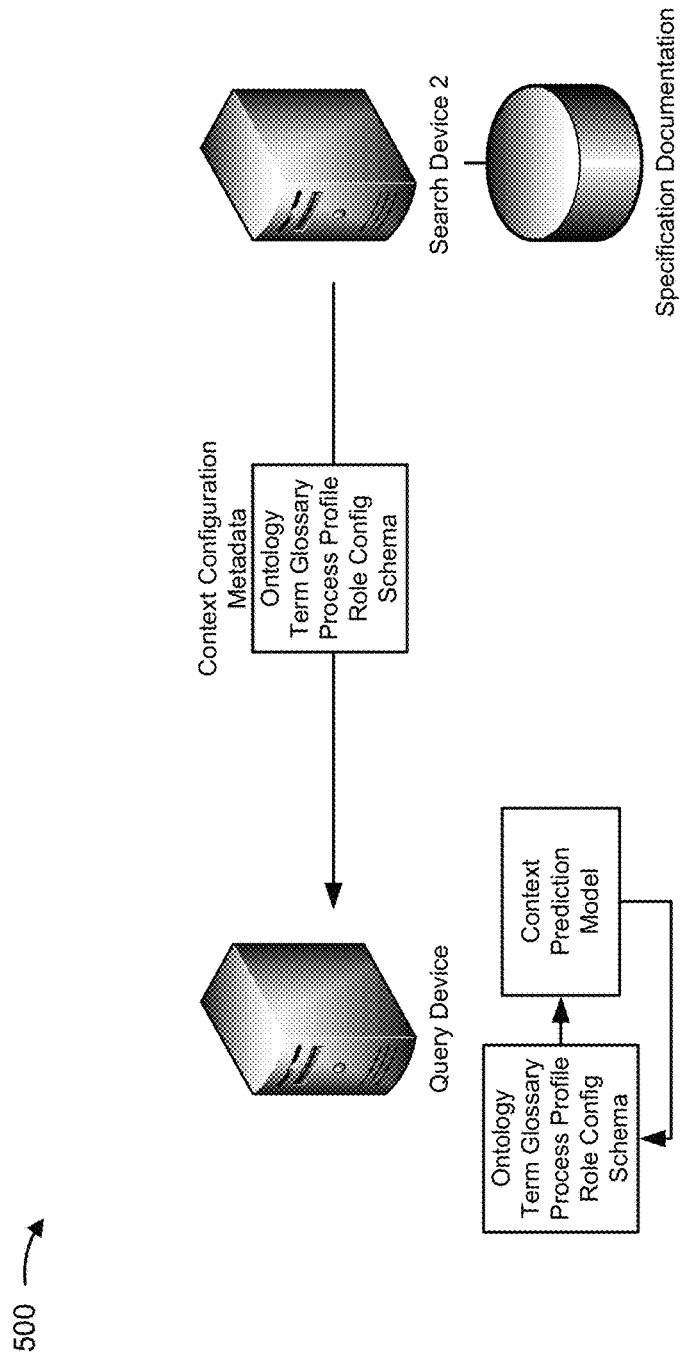

As shown in FIG. 5D, assume, for example implementation 500, that in response to query device 220's request for context configuration information associated with the Specification Documentation repository, the second search device 230 sends, to query device 220, an ontology, term glossary, process profile, role configuration information, and schema associated with the Specification Documentation repository. In this case, rather than crawling the repository, query device 220 updates the context prediction model based on the ontology, term glossary, process profile, role configuration information, and schema received from the second search device 230.

As indicated above, FIGS. 5A-5D are provided merely as an example. Other examples are possible and may differ from what was described with regard to FIGS. 5A-5D.

Figure 6:
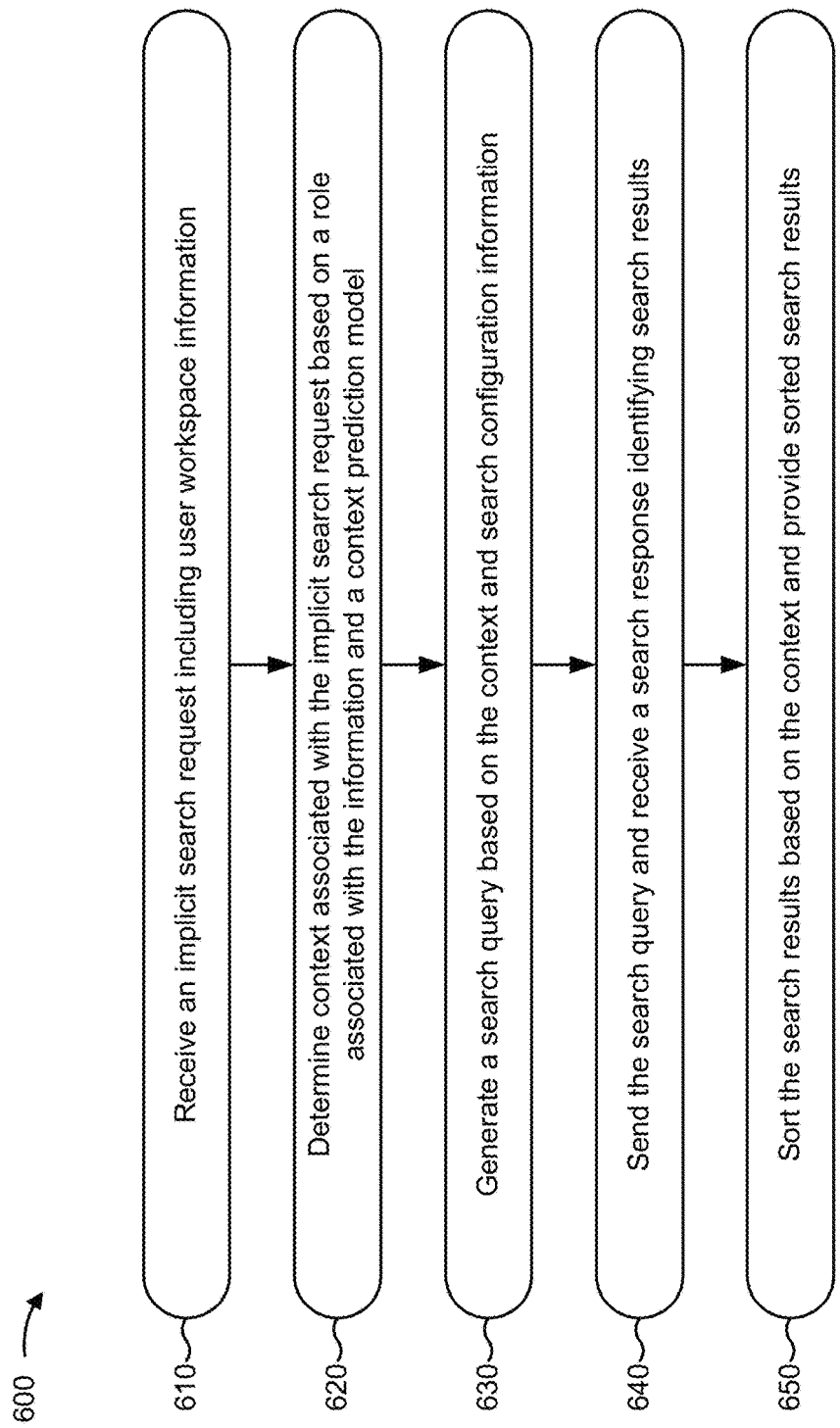
FIG. 6 is a flow chart of an example process for using an implicit search service.

FIG. 6 is a flow chart of an example process 600 for using an implicit search service. In some implementations, one or more process blocks of FIG. 6 may be performed by query device 220. In some implementations, one or more process blocks of FIG. 6 may be performed by another device or a group of devices separate from or including query device 220, such as user device 210 and/or search device 230.

As shown in FIG. 6, process 600 may include receiving an implicit search request including user workspace information (block 610). For example, user device 210 may automatically send, to query device 220, an implicit search request based on the user opening a resource, selecting and/or perseverating on a portion of a resource, adding, modifying, or removing content from the resource, or the like. The implicit search request, sent by user device 210, may include workspace information that includes the resource (or portion of the resource) which triggered the request, other resources, information associated with the user, and/or other information associated with the user's workspace. The information associated with the user may identify the user (e.g., via a name, username, password, user identifier, etc.), a role associated with the user, and/or search preferences (e.g., options, objectives, strategies, logic, etc. which modify a search query associated with the implicit search request). The search preferences may include search terms input by the user (e.g., to modify the implicit search request and/or search within a list of results provided to the user). The workspace information may identify a task, project, environment, phase, etc. associated with the user's workspace. The resource may be a document and/or other work product associated with the user's workspace (e.g., a currently open document and/or all documents associated with a current task/project). The received information may enable query device 220 to determine a particular user and/or task for which to obtain relevant information. In this way, query device 220 may automatically receive information associated with a search query without requiring user input (e.g., without the user explicitly requesting a search).

As further shown in FIG. 6, process 600 may include determining a context associated with the implicit search request based on a role associated with the information and a context prediction model (block 620). For example, query device 220 may determine a context associated with the resource based on the user information, workspace information, the resource, the context configuration information, and/or the context prediction model. For example, query device 220 may determine the context by identifying concepts, words, phrases, relationships, and/or capabilities associated with the resource based on context configuration information including, e.g., an ontology, term glossary, and/or process profile. The context may further include an intent associated with the user. Query device 220 may determine the intent based on the information associated with the user (e.g., a role, associated with the user, which may be identified in the role configuration information), search preferences, workspace information, and/or the context prediction model. For example, query device query device 220 may limit the context, based on the role configuration information, to objectives, relevant search repositories, etc. associated with the intent. Determining the context, including the intent, may enable query device 220 to tailor a search query and/or search results to a particular user and/or situation. In this way, query device 220 relieves the user of the burden of determining what terms to use for a search.

As further shown in FIG. 6, process 600 may include generating a search query based on the context and search configuration information (block 630). Query device 220 may form the search query based on the context and search configuration information associated with the implicit search request. For example, query device 220 may assemble the concepts, words, phrases, relationships, and/or capabilities included in the context into a search query according to query options identified in the search configuration information. Query device 220 may identify, in the search query, a search device, search repository, additional query option, etc. which query device 220 determines to be associated with the implicit search request. In this way, query device 220 relieves the user of the burden of determining how and where to search for relevant resources.

As further shown in FIG. 6, process 600 may include sending the search query and receiving a search response identifying search results (block 640). For example, query device 220 may send the search query to the search device 230 identified for the search query based on the search configuration information. Alternatively, or additionally, query device 220 may route, through a first search device 230, the search query identifying a second search device 230. Query device 220 may likewise receive a search response, from the search device 230 identified by the search query and/or another search device 230, identifying search results. The search results may identify and/or include resources which match the search query and are, thus, relevant to the user's task.

As further shown in FIG. 6, process 600 may include sorting the search results based on the context and providing sorted search results (block 650). For example, for each of the resources identified in the search results, query device 220 may determine a likelihood that the resource is associated with the context/intent associated with the implicit search request. Query device 220 may determine the likelihood by determining the probability of the context of each resource matching the context associated with the implicit search request using, e.g., the context prediction model, the context configuration information, or a content based classification technique. Alternatively, or additionally, query device 220 may determine the likelihood by determining a probability that the search result is of interest to the user. Alternatively, or additionally, query device 220 may score each of the search results based on identifying, e.g., terms, concepts, or the like associated with the search results.

Query device 220 may sort the search results based on the likelihood that each result is associated with the context/intent and provide the sorted search results to user device 210. Alternatively, or additionally, query device 220 may send, to user device 210, a quantity or portion of the search results whose likelihood satisfies an absolute and/or relative threshold (e.g., a set quantity/percentage of results and/or results whose score/probability/likelihood falls within a set range). In this way, query device 220 may relieve a user of the burden of sorting the search results to quickly identify the resources most relevant to completing the user's task.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
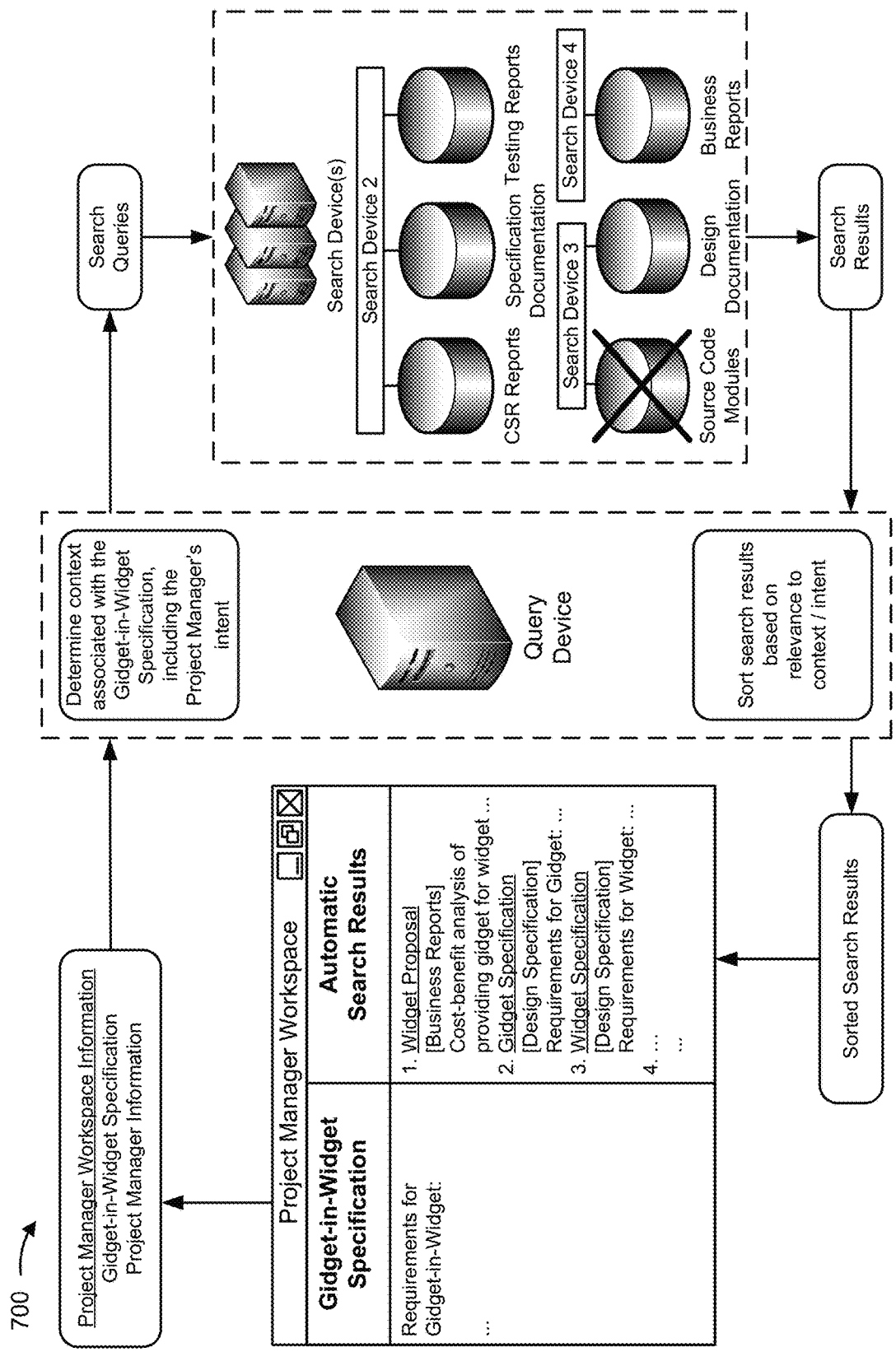
FIGS. 7A-7C are diagrams of example implementations relating to the example process shown in FIG. 6.
Figure 7B:
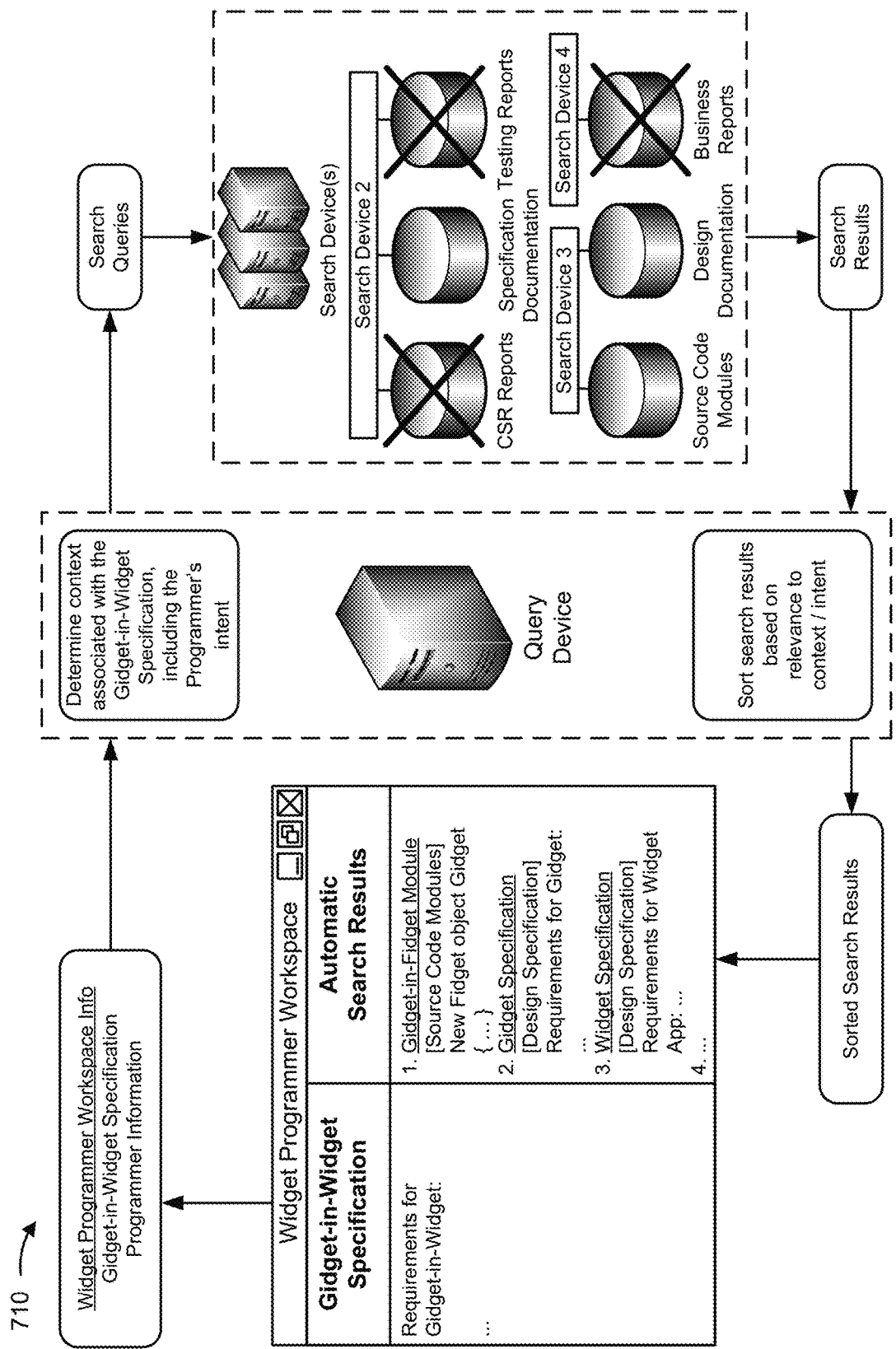
Figure 7C:
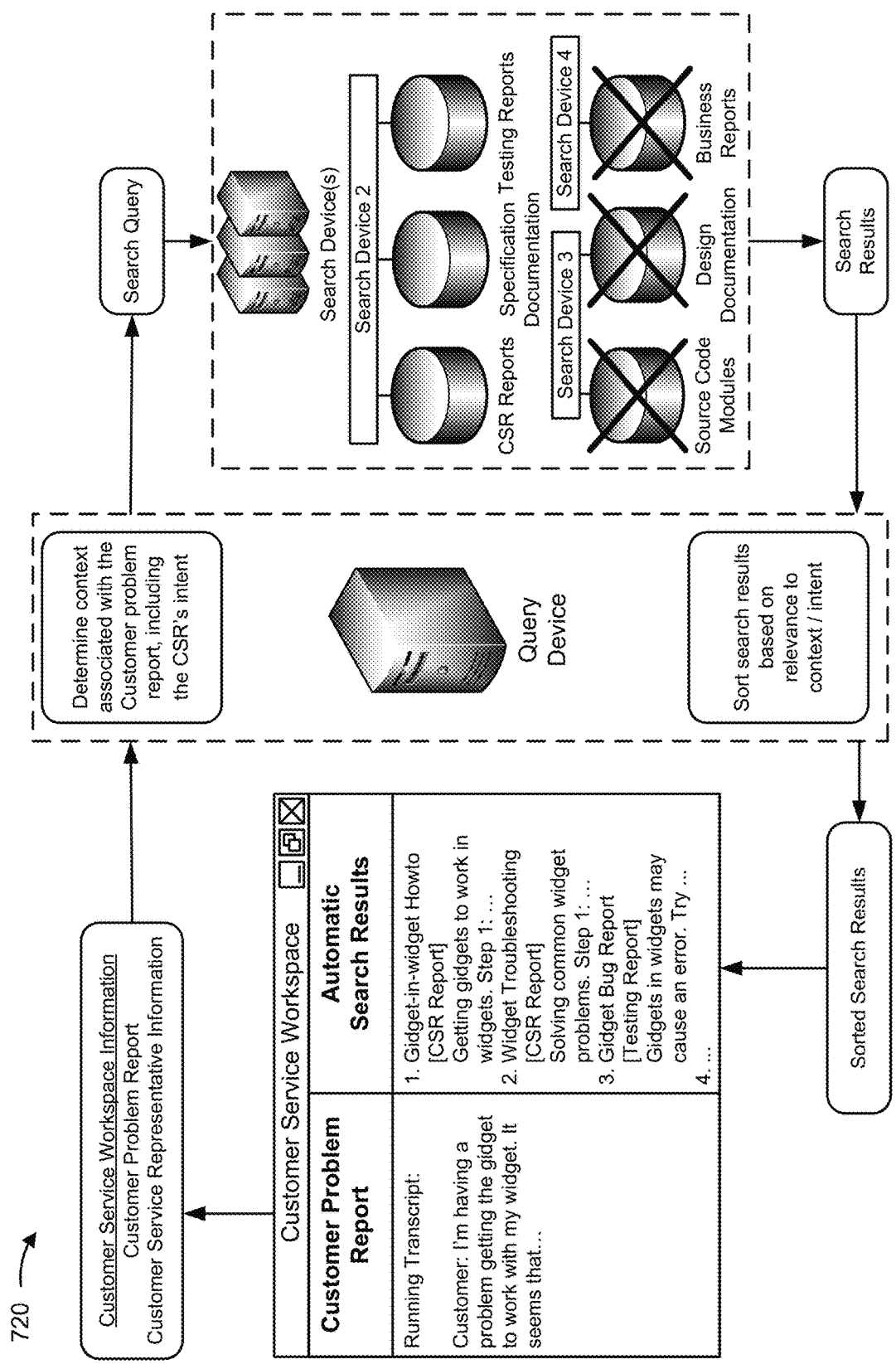

FIGS. 7A-7C are diagrams of example implementations 700-720 relating to example process 600 shown in FIG. 6. FIGS. 7A-7C show an example of using an implicit search service.

As shown in FIG. 7A, assume, for example implementation 700, that an implicit search service has been set up according to the example implementation described in FIGS. 5A-5C. Assume further that a project manager logs into a user device (e.g., user device 210) and opens a document entitled "Gidget-in-Widget Specification" within a project manager workspace. Assume further that "widgets" and "gidgets" are elements which may be used together and that the Gidget-in-Widget Specification is a work product which describes specifications for implementing a combination of a gidget and a widget. After opening the Gidget-in-Widget Specification, user device 210 automatically (e.g., without an explicit request from the project manager) sends, to query device 220, an implicit search request including the Gidget-in-Widget Specification (or a portion thereof) as well as information associated with the project manager (e.g., a username, job title, and/or position) and the project manager workspace (e.g., a project, phase, and/or environment).

As further shown in FIG. 7A, assume, for example implementation 700, that query device 220 determines, based on the role configuration information and the context configuration information and/or context prediction model, a context associated with the Gidget-in-Widget Specification, including the project manager's associated intent (e.g., making a business decision). Assume that query device 220 further determines, based on the search configuration information, that search repositories associated with the context include: CSR Reports, Specification Documentation, Testing Reports, Design Documentation, and Business Reports. Based on the search configuration information, query device 220 may further identify the second, third, and fourth search devices 230 as being associated with these relevant search repositories.

As further shown in FIG. 7A, assume, for example implementation 700, that query device 220 generates and sends, to each of the second, third, and fourth search devices 230, a search query based on the context and the search configuration information. Query device 220 receives, from one or more of these search devices 230, search results identifying resources from the relevant search repositories, determines a likelihood that each of the resources is associated with the context and/or of interest to the user, and sorts the received search results based on each search result's likelihood. Query device 220 sends, to user device 210, the sorted search results. Assume that user device 210 displays the sorted results ordered by likelihood, listing first a "Widget Proposal" document, from the Business Reports repository, which provides a cost-benefit analysis of a widget-gidget combination; listing second a "Gidget Specification" document, from the Design Specification repository, which provides specifications for a Gidget element; and listing third a "Widget Specification" document, also from the Design Specification repository, which provides specifications for a Widget element. In this way, the implicit search service may automatically provide the project manager with resources most relevant to the project manager's use of the Gidget-in-Widget Specification.

As shown in FIG. 7B, assume, for example implementation 710, that a programmer logs into a user device (e.g., user device 210) and opens the Gidget-in-Widget Specification document within a widget programmer workspace. After opening the Gidget-in-Widget Specification, user device 210 automatically sends, to query device 220, an implicit search request including the Gidget-in-Widget Specification (or a portion thereof) and information about the programmer (e.g., a username, job title, and/or position) and the widget programmer workspace (e.g., a project, phase, and/or environment). Query device 220 determines a context associated with the programmer's use of the Gidget-in-Widget Specification, including the programmer's intent (e.g., programming the widget-gidget combination), which is different from the project manager's intent. Assume that query device 220 determines that search repositories associated with the context include: Specification Documentation, Source Code Modules, and Design Documentation. Based on the search configuration information, query device 220 further identifies the second, third, and fourth search devices 230 as being associated with these relevant search repositories.

As further shown in FIG. 7B, assume, for example implementation 710, that query device 220 generates and sends search queries based on the context and the search configuration information. Query device 220 likewise receives search results identifying resources from the relevant search repositories, determines a relevance value associated with each of the resources, sorts the received search results based on the relevance values, and sends the sorted search results to user device 210 for display to the programmer. Unlike the sorted search results displayed to the project manager, user device 210 lists first a "Gidget-in-Fidget Module" document, from the Source Code Modules repository, which provides source code for implementing a gidget-fidget combination followed by the Gidget Specification and Widget Specification, respectively. In this way, the implicit search service automatically provides the programmer with resources most relevant to the programmer's use of the Gidget-in-Widget Specification, which may be different from the project manager's use of the same document.

As shown in FIG. 7C, assume, for example implementation 720, that a customer service representative is engaged in a conversation with a customer about a problem the customer is having with the gidget-widget combination. Assume further that the customer service representative is logged into a user device (e.g., user device 210) which displays a running transcript of the conversation as part of a "Customer Problem Report" document within a customer service workspace. As the conversation progresses, user device 210 may send, to query device 220, the Customer Problem Report containing the running transcript as well as information about the customer service representative and the customer service workspace. Query device 220 determines the context associated with the Customer Problem Report, including the customer service representative's associated intent (e.g., to solve the customer's problem). Assume that query device 220 determines that search repositories associated with the context include: CSR Reports, Specification Documentation, and Testing Reports. Based on the search configuration information, query device 220 further identifies the second search device 230 as being associated with these relevant search repositories.

As further shown in FIG. 7C, assume, for example implementation 720, that query device 220 generates and sends a search query based on the context and the search configuration information. Query device 220 likewise receives search results identifying resources from the relevant search repositories, determines a relevance value associated with each of the resources, sorts the received search results based on the relevance values, and sends the sorted search results to user device 210 for display to the customer service representative. Assume that user device 210 lists first a "Gidget-in-widget Howto" document, from the CSR Reports repository, which provides information for getting gidgets to work in widgets; lists second a "Widget Troubleshooting" document, also from the CSR Reports repository, which provides information for solving common widget problems; and lists third a "Gidget Bug Report" document, from the Testing Reports repository, which provides information about an error associated with using a gidget-widget combination. In this way, the implicit search service may automatically provide the customer service representative with resources most relevant to helping the customer with the problem.

As indicated above, FIGS. 7A-7C are provided merely as examples. Other examples are possible and may differ from what was described with regard to FIGS. 7A-7C.

Implementations described herein may assist a user of a user device with completing a task by automatically (e.g., without an explicit user request, without user input, etc.) providing the user with search results identifying existing resources which are most relevant to the user and the task.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
 receive, from a user device, an implicit search request including user workspace information associated with a user workspace,
  the user workspace information including a project associated with the user workspace,
   the project being associated with a platform and a plurality of phases;
 determine a context, including a user intent, based on the user workspace information,
  the user intent being determined based on:
   a user role,
    the user role including one or more of a job title or position, and
   one or more objectives associated with a phase, of the plurality of phases, of the project,
    the phase being associated with the user role;
 identify one or more search repositories from a set of search repositories based on the user role and the user workspace information;
 send a search query to the one or more search repositories based on the context,
  the search query being formed based on the context and search configuration information associated with the implicit search request,
   the search configuration information including permission information associated with the one or more search repositories, and
   the context being limited based on the user role and the one or more objectives;
 receive a search response identifying search results based on the search query; and
 provide, to the user device, at least some of the search results identified in the search response.

2. The device of claim 1, where the one or more processors, when determining the context, are to:
 receive context configuration information including a context prediction model associated with an ontology which identifies a hierarchy of concepts associated with a domain; and
 determine the context based on the context prediction model, the context including one or more concepts identified in the ontology.

3. The device of claim 1, where the one or more processors are further to:
receive context configuration information identifying one or more roles and including role information associated with the one or more roles; and
identify the user role, from the one or more roles identified in the context configuration information, associated with the implicit search request, based on the user workspace information.

4. The device of claim 1, where the one or more processors, when sending the search query based on the context, are to:
receive the search configuration information identifying a search device and a query option;
generate the search query based on the search device, the query option, and the context; and
send the search query to the search device identified by the search configuration information.

5. The device of claim 1, where the one or more processors, when providing the at least some of the search results identified in the search response, are to:
determine, for each search result, of the search results identified in the search response, a likelihood that the search result is associated with the context;
sort the search results based on the likelihoods that the search results are associated with the context; and
provide, to the user device, the at least some of the search results sorted based on the likelihoods that the search results are associated with the context.

6. The device of claim 1, where the one or more processors, when determining the context, are to:
receive context metadata associated with resources from the one or more search repositories;
generate rules for a context prediction model based on the context metadata; and
determine the context based on the context prediction model.

7. The device of claim 1, where the one or more processors when receiving the implicit search request, are to:
receive the implicit search request based on determining a document associated with the project on the user workspace was opened.

8. A non-transitory computer-readable medium storing instructions, the instructions comprising:
one or more instructions that, when executed by one or more processors of a first device, cause the one or more processors to:
receive, from a user device, an implicit search request including user workspace information associated with a user workspace,
the user workspace information including a project associated with the user workspace,
the project being associated with a platform and a plurality of phases;
determine a context, including a user intent, based on the user workspace information,
the user intent being determined based on:
a user role,
the user role including one or more of a job title or position, and
one or more objectives associated with a phase, of the plurality of phases, of the project,
the phase being associated with the user role;
identify one or more search repositories from a set of search repositories based on the user role and the user workspace information;
send a search query to the one or more search repositories based on the context,
the search query being formed based on the context and search configuration information associated with the implicit search request,
the search configuration information including permission information associated with the one or more search repositories, and
the context being limited based on the user role and the one or more objectives;
receive a search response identifying search results based on the search query; and
provide, to the user device, at least some of the search results identified in the search response.

9. The non-transitory computer-readable medium of claim 8, where the one or more instructions, that cause the one or more processors to determine the context, cause the one or more processors to:
receive context configuration information including a context prediction model associated with an ontology which identifies a hierarchy of concepts associated with a domain; and
determine the context based on the context prediction model, the context including one or more concepts identified in the ontology.

10. The non-transitory computer-readable medium of claim 8, where the one or more instructions, when executed by the one or more processors, further cause the one or more processors to:
receive context configuration information identifying one or more roles and including role information associated with the one or more roles; and
identify the user role, from the one or more roles identified in the context configuration information, associated with the implicit search request, based on the user workspace information.

11. The non-transitory computer-readable medium of claim 8, where the one or more instructions, that cause the one or more processors to send the search query based on the context, cause the one or more processors to:
receive the search configuration information identifying a search device and a query option;
generate the search query based on the search device, the query option, and the context; and
send the search query to the search device identified by the search configuration information.

12. The non-transitory computer-readable medium of claim 8, where the one or more instructions, that cause the one or more processors to provide at least some of the search results identified in the search response, cause the one or more processors to:
determine, for each search result, of the search results identified in the search response, a likelihood that the search result is associated with the context;
sort the search results based on the likelihoods that the search results are associated with the context; and
provide, to the user device, at least some of the search results sorted based on the likelihoods that the search results are associated with the context.

13. The non-transitory computer-readable medium of claim 8, where the one or more instructions, that cause the one or more processors to determine the context, cause the one or more processors to:
receive context metadata associated with resources from the one or more search repositories;
generate rules for a context prediction model based on the context metadata; and determine the context based on the context prediction model.

14. The non-transitory computer-readable medium of claim 8, where the one or more instructions further cause the one or more processors to:
assemble one or more of relationships or capabilities included in the context into the search query based on query options identifier in the search configuration information.

15. A method, comprising:
receiving, from a user device, an implicit search request including user workspace information associated with a user workspace,
the user workspace information including a project associated with the user workspace,
the project being associated with a platform and a plurality of phases;
determining a context, including a user intent, based on the user workspace information,
the user intent being determined based on:
a user role,
the user role including one or more of a job title or position, and
one or more objectives associated with a phase, of the plurality of phases, of the project,
the phase being associated with the user role;
identifying one or more search repositories from a set of search repositories based on the user role and the user workspace information;
sending a search query to the one or more search repositories based on the context,
the search query being formed based on the context and search configuration information associated with the implicit search request,
the search configuration information including permission information associated with the one or more search repositories, and
the context being limited based on the user role and the one or more objectives;
receiving a search response identifying search results based on the search query; and
providing, to the user device, at least some of the search results identified in the search response.

16. The method of claim 15, where determining the context comprises:
receiving context configuration information including a context prediction model associated with an ontology which identifies a hierarchy of concepts associated with a domain; and
determining the context based on the context prediction model, the context including one or more concepts identified in the ontology.

17. The method of claim 15, further comprising:
receiving context configuration information identifying one or more roles and including role information associated with the one or more roles; and
identifying the user role, from the one or more roles identified in the context configuration information, associated with the implicit search request, based on the user workspace information.

18. The method of claim 15, where sending the search query based on the context comprises:
receiving the search configuration information identifying a search device and a query option;
generating the search query based on the search device, the query option, and the context; and
sending the search query to the search device identified by the search configuration information.

19. The method of claim 15, where providing the at least some of the search results identified in the search response comprises:
determining, for each search result, of the search results identified in the search response, a likelihood that the search result is associated with the context;
sorting the search results based on the likelihoods that the search results are associated with the context; and
providing, to the user device, at least some of the search results sorted based on the likelihoods that the search results are associated with the context.

20. The method of claim 15, further comprising:
for each resource identifier in the search results, determining a probability that a resource is associated with the user intent associated with the implicit search request.

* * * * *